United States Patent [19]

Edwards et al.

[11] 3,976,861
[45] Aug. 24, 1976

[54] APPARATUS FOR MAINTAINING A CONSTANT SURFACE SPEED OF A ROTATING WORK PIECE BEING CUT BY A MOVING CUTTING TOOL

[75] Inventors: Clarence Roy Edwards, Stuartsdraft, Va.; John James Nolan, Lyndonville, Vt.

[73] Assignee: General Electric Company, New York, N.Y.

[22] Filed: June 27, 1975

[21] Appl. No.: 591,166

[52] U.S. Cl. ............................ 235/151.11; 82/2 B; 82/29 A; 235/92 MP; 318/571
[51] Int. Cl.$^2$ ........................................... B23Q 5/08
[58] Field of Search ................ 318/39, 571; 82/2 B; 235/151.11, 92 MP, 92 CA

[56] References Cited
UNITED STATES PATENTS

| | | | |
|---|---|---|---|
| 3,656,377 | 4/1972 | Kosem | 235/151.11 X |
| 3,665,170 | 5/1972 | Bakel et al. | 235/151.11 |
| 3,720,120 | 3/1973 | Cutler | 235/151.11 X |
| 3,725,651 | 4/1973 | Cutler | 235/151.11 |
| 3,793,511 | 2/1974 | Bala et al. | 235/151.11 |

*Primary Examiner*—Eugene G. Botz
*Attorney, Agent, or Firm*—Stephen A. Young; Walter C. Bernkopf; Robert A. Cahill

[57] ABSTRACT

An apparatus for maintaining a constant surface speed of a rotating work piece being cut by a moving cutting tool, comprising means for storing a first signal representing a binary coded decimal number which is further representative of the product of the desired constant surface speed of the work piece and a conversion constant. The apparatus is further comprised of a shift register for receiving a second signal representing a binary coded decimal number which is further representative of the current radial dimension of the work piece being cut, and means for storing a third signal representing a binary coded decimal number initially representative of an assumed rotational speed of the work piece. Means for arithmetically multiplying the binary coded number representative of the radial dimension of the work piece by the binary coded number representative of the assumed rotational speed of the work piece is also provided, along with a means for storing a fourth signal representing a binary coded decimal number which is further representative of the product of the radial dimension of the work piece and the rotational speed of the work piece. Further provided is a means for comparing the first signal representing the binary coded decimal number which is representative of the product of the desired constant speed of the work piece and the conversion constant with the fourth signal representing the binary coded decimal number which is representative of the product of the radial dimension of the work piece and the assumed rotational speed of the work piece, and for providing a fifth signal to adjust the binary coded decimal number representative of the assumed rotational speed of the work piece until the compared first and fourth signals are made approximately equal, at which time a sixth signal representing a final binary coded decimal number representative of the required rotational speed of the work piece is generated to control the speed of a motor that drives a spindle which holds the work piece.

3 Claims, 1 Drawing Figure

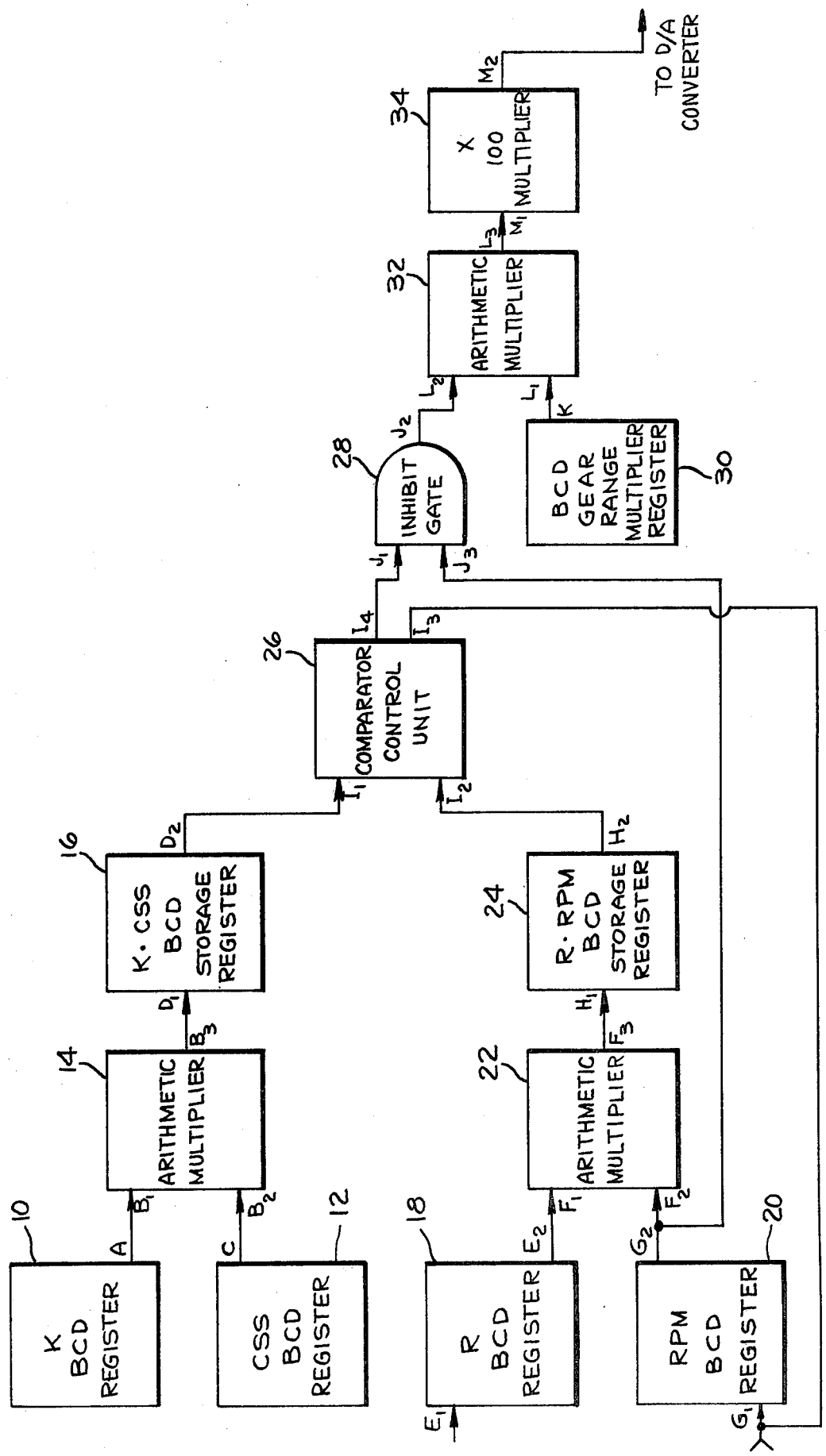

APPARATUS FOR MAINTAINING A CONSTANT SURFACE SPEED OF A ROTATING WORK PIECE BEING CUT BY A MOVING CUTTING TOOL

BACKGROUND OF THE INVENTION

1. Field of The Invention

This invention relates to an apparatus for maintaining a constant surface speed of a rotating work piece being cut by a moving tool.

2. Description of The Prior Art

When using a lathe to machine a rotating piece of metal stock, it has been found that the productivity of machining and the quality of the surface finish of the product can be optimized if it is possible to maintain a constant surface speed of the work piece being cut. The maintenance of the constant surface speed presents a problem, since, as the diameter of the work piece is reduced, the surface speed of the rotating metal stock tends to decrease if the RPM of the stock remains constant, because the surface speed is proportional to the angular velocity of rotation of the stock multiplied by the radius of the stock. Therefore, in order to continue to maintain constant surface speed of a rotating work piece, whose radial dimension is continuously being reduced, one prior art technique calls for a change in the spindle speed in response to sensed incremental changes in the diameter of the work piece. Thus, if one wants to cut 10 radial inches from a work piece, and also wants to change the surface speed every time the radius of the work piece is reduced ¼ of an inch, then 40 separate programming control blocks would be required to initiate 40 separate commands. Using this approach, the work piece would have a very rough surface finish, and the precision of the cut of the work piece would likewise be limited. In order to obtain a more accurate, smoother surface finish and a more precise machined part, it would be necessary to provide more programming commands. However, further increasing the programming commands could ultimately reduce the response time of the system to an unacceptable level.

Alternate analog techniques for accomplishing the above purposes have been provided by manually controlling the setting of a potentiometer or by automatically controlling the gain of an analog amplifier as a function of the spindle motor speed. However, again these analoging techniques are limited both in accuracy and in response time.

A further technique has been described in U.S. Pat. No. 3,665,170. This patent essentially describes the product of the actual radius of the work piece and the spindle speed being integrated over a period of time by using a differential digital analyzer. However, since it is necessary to await the arrival of the overflow output from the differential digital analyzer over the period of the integration before corrective action can be taken, the response time of this system is accordingly slow. When the radius of the work piece becomes smaller and smaller, the RPM of the work piece, or spindle holding the work piece, must change faster in order to maintain a constant surface speed of the work piece. Since the integration technique used in this patent is inherently slow, its poor dynamic response renders its use inadequate for increased cutting ranges, especially when high cutting speeds are required.

OBJECTS OF THE INVENTION

It is therefore an object of this invention to provide an apparatus for use in a numerical control system for maintaining a constant surface speed of a rotating work piece being cut by a moving cutting tool, wherein the apparatus has an improved dynamic response and accuracy over the above described prior art apparatus.

It is another object of this invention to provide an apparatus that maintains a constant surface speed of a rotating work piece being cut over an increased cutting range down to smaller work piece radii, while at the same time operating over faster spindle and cutting speeds.

Other objects of the invention will hereinafter be pointed out.

SUMMARY OF THE INVENTION

According to a broad aspect of the invention there is provided an apparatus for maintaining a constant surface speed of a rotating work piece being cut by a moving cutting tool comprising means for storing a first signal representing a binary coded decimal number further representative of the product of the desired constant surface speed of the work piece and a conversion constant. Further provided are a shift register for receiving a second signal representing a binary coded decimal number which is representative of the current radial dimension of the work piece being cut, and means for storing a third signal representing a binary coded decimal number initially representative of an assumed rotational speed of the work piece. Also provided are means for arithmetically multiplying the binary coded number representative of the radial dimension of the work piece by the binary coded number representative of the assumed rotational speed of the work piece, and means for storing a fourth signal representing a binary coded decimal number which is further representative of the product of the radial dimension of the work piece and the rotational speed of the work piece. The apparatus further includes a means for comparing the first signal representing the binary coded decimal number representative of the product of the desired constant speed of the work piece and the conversion constant with the fourth signal representing the binary coded decimal number representative of the product of the radial dimension of the work piece and the assumed rotational speed of the work piece, and for providing a fifth signal to adjust the binary coded decimal number representative of the assumed rotational speed of the work piece until the compared first and fourth signals are made approximately equal, at which time a sixth signal representing a final binary coded decimal number representative of the required rotational speed of the work piece is generated to control the speed of a motor that drives a spindle which holds the work piece.

According to another feature of the invention the apparatus for maintaining a constant surface speed of a rotating work piece being cut by a moving cutting tool is further comprised of means for storing a signal representing a binary coded decimal number which is the reciprocal of a maximum allowable rotational speed of the work piece for a selected gear range, means for multiplying the binary coded decimal number representative of the required rotational speed of the work piece by the binary coded decimal number representative of the reciprocal of the maximum allowable rotational speed of the work piece for the selected gear range, and means for multiplying by a factor of 100 the multiple of the binary coded decimal number representative of the required rotational speed of the work piece and the reciprocal of the maximum allowable rotational speed of the work piece for the selected gear range to obtain another signal representing a binary coded decimal number which is representative of a percentage spindle motor speed for controlling the surface speed of the rotating work piece.

BRIEF DESCRIPTION OF THE DRAWING

The sole FIGURE for the drawing shows a block diagram of the apparatus used for maintaining a constant surface speed of a rotating work piece being cut by a moving cutting tool.

DESCRIPTION OF THE PREFERRED EMBODIMENT

Referring now to the drawing, the apparatus for maintaining a constant surface speed of the rotating work piece being cut by a moving cutting tool, is comprised of a K BCD register 10, a CSS BCD register 12, an arithmetic multiplier 14, a K·CSS BCD storage register 16, a R BCD register 18, an RPM BCD register 20, an arithmetic multiplier 22, an R·RPM BCD register 24, a comparator control unit 26, a inhibit gate 28, a BCD gear range multiplier register 30, an arithmetic multiplier 32, and an X 100 multiplier 34.

In this system, the desired constant surface speed of the work piece being cut (CSS) multiplied by a conversion constant (K) is made equal to the radius (R) of the work piece being cut multiplied by the spindle RPM or the RPM of the work piece. Inasmuch as the constant surface speed is in surface feet per minute, and the radius of the work piece is in inches, the conversion constant (K) is made equal, in this instance, to $12/2\pi$ or 1.9099. (K) register 10, in this instance, can be a standard shift register adapted to receive a signal in 8 binary coded decimal digits which is representative of the predetermined conversion constant (K). Similarly CSS register 12 can also be a shift register adapted to receive a signal in 4 binary coded decimal digits which is representative of the predetermined desired constant surface speed of the work piece to be cut. The signal from (K) register 10 is electrically coupled, via an output terminal A, to an input terminal $B_1$ of arithmetic multiplier 14, while the signal from CSS register 12 is electrically coupled from an output terminal C to an input terminal $B_2$ of arithmetic multiplier 14. Multiplier 14 is a standard type unit, which produces a signal corresponding to the product of K and CSS, and couples this signal from an output terminal $B_3$ to an input terminal $D_1$ of K·CSS register 16. Register 16 can be any standard type storage register or core memory, which stores the product of the conversion constant and the desired constant surface speed in binary coded decimal form therein.

R register 18 is also a shift register adapted to receive a signal in 7 binary coded decimal digits, which is representative of the current radius of the work piece having a precision and accuracy to 0.0001 inches. The original radius of the work piece, of course, is known, and as the radius of the work piece diminishes during the cutting operation, R register 18 continuously receives updated signals which indicate changes in the radius of the work piece in increments of 0.0001 inches. The actual radius of the work piece is usually determined by the distance between the cutting edge of the cutting tool and the center line of the work piece or the spindle holding the work piece. This distance is readily determined and converted to a signal representing a 7 binary coded decimal digit number in a manner similarly described in the previously referred to U.S. patent 3,665,170. The signal representative of the 7 binary coded decimal digit number representing the radius of the work piece is received by R register 18 at an input terminal $E_1$, and the output signal from the R register is electrically coupled from an output terminal $E_2$ to an input terminal $F_1$ of arithmetic multiplier 22. RPM register 20 is a shift register which receives a signal representing, in this instance, 4 binary coded decimal digits initially received from an input terminal $G_1$ and this signal can have a initial value of either 1,000 RPM or 0 or any number in between. An output terminal $G_2$ of RPM register 20 electrically couples the signal representing the binary coded decimal RPM number to an input terminal $F_2$ of arithmetic multiplier 22. Arithmetic multiplier 22 can be a similar type component as arithmetic multiplier 14, and produces at an output terminal $F_2$ thereof a signal which is the product of the radius of the work piece and the RPM of the spindle or work piece, which product is transmitted to an input terminal $H_1$ of R·RPM storage register 24. Register 24 can be any suitable type of storage register or core memory.

The stored signals in respective storage registers 16 and 24 are respectfully coupled from respective output terminals $D_2$ and $H_2$ to respective input terminals $I_1$ and $I_2$ of comparator control unit 26. Comparator control unit 26, which can be any standard component suitable for the purpose, compares the signals received at the respective inputs $I_1$ and $I_2$, and if these signals are not equal, a signal from an output terminal $I_3$ is provided which is fed back to input terminal $G_1$ of RPM register 20 to adjust the binary coded decimal signal representative of the assumed RPM of the work piece until the input signals received at input terminals $I_1$ and $I_2$ are approximately equal. At this time, it is determined that the signal representative of the RPM of the work piece or spindle is the desired value, and a signal at output terminal $I_4$ of comparator control unit 26 is transmitted to an enabling terminal $J_1$ of inhibit gate 28 to allow the signal representative of the desired RPM of the work piece to be generated at an output terminal $J_2$ of the inhibit gate, as the signal representative of the desired RPM is electrically coupled from output terminal $G_2$ of RPM register 20 through an input terminal $J_3$ of inhibit gate 28 and to its output terminal $J_2$.

Gear range multiplier register 30 is also comprised of a standard shift register for receiving a signal having 8 binary coded decimal digits, which signal is the reciprocal of the maximum allowable rotational speed of the spindle or work piece for a selected gear range. For example, if the maximum allowable rotational speed of the spindle or work piece is selected to be no greater than 2500 RPM for a selected gear ratio, the signal representative of the gear range multiplier (GRM) is equal to 0.00040000. This particular GRM signal is received by gear range multiplier register 30, and it is transmitted from an output terminal K to an input $L_1$ of arithmetic multiplier 32. The generated signal representative of the desired spindle RPM is also electrically coupled from output terminal $J_2$ of inhibit gate 28 to an input terminal $L_2$ of arithmetic multiplier 32. Arithmetic multiplier 32 is a standard multiplier of the type previously described with reference to arithmetic multipliers 14 and 22. The signals received at the inputs of arithmetic multiplier 32 are multiplied and transferred from an output terminal $L_3$ to a input terminal $M_1$ of multiplier 34. Multiplier 34 is a standard decimal type multiplier for multiplying the received signal by a factor of 100. The signal at the output $M_2$ of multiplier 34 has thus been converted to a binary coded decimal number in the form of the desired percent spindle motor speed. This signal is then transmitted to a digital to analog converter and then to a spindle motor to control or adjust the RPM of the spindle and work piece to its desired value. Actual processing of the signal once it reaches the D to A converter and spindle servo drive or motor is further described in the above referred to U.S. Pat. No. 3,665,170. If the output signal at terminal $M_2$ of multiplier 34 is equal to or greater than 100 percent, then this indicates that the desired RPM spindle speed is equal to or greater than the maximum allowable spindle speed for the selected gear range. Under these circumstances, the selected gear range should be changed to provide for a greater maximum allowable spindle speed, and this can be accomplished either manually or automatically. Once this change takes place, a new gear range multiplier signal in the form of an eight digit binary coded decimal number is set into register 30.

The operation of the above described apparatus for maintaining a constant surface speed of a rotating work piece being cut by a moving cutting tool will now be summarized. The signals representative of the calculated conversion constant and the desired constant surface speed of the rotating work piece being cut are respectively fed into registers 10 and 12. The signal representative of the initial radius of the work piece is also fed into register 18, while a signal representative of an assumed initial RPM of the work piece is fed into register 20. The respective signals representative of the product of the conversion constant and the constant surface speed and the product of the work piece radius and the initial RPM of the spindle or work piece are compared by comparator 26. If the signals are not equal, then a signal at the output $I_4$ of comparator control unit 26 is applied to the control input $J_1$ of inhibitor gate 28 to prevent passage of any signals through the gate. At the same time, if the signal representative of the product of the conversion constant and the constant surface speed is greater than the signal representative of the product of the radius of the work piece and its assumed RPM, then the comparator control unit produces an output signal at output $I_3$ which is electrically coupled back to input $G_1$ of RPM register 20 to increase the numerical value of the binary coded decimal number stored therein until the respective signals received at inputs $I_1$ and $I_2$ of the comparator control unit are made approximately equal. Similarly, if the signal representative of the product of the conversion constant and the constant surface speed were less than the signal representative of the work piece radius and the work piece RPM, then the signal at output $I_3$ of the comparator control unit would be coupled back to the input $G_1$ of RPM register 20 to decrease the binary coded decimal number therein until the signals at the inputs $I_1$ and $I_2$ of the comparator control unit are made approximately equal. When the signals at $I_1$ and $I_2$ are made approximately equal, the comparator control unit produces a signal at output $I_4$, which is coupled to control input terminal $J_1$ of inhibit gate 28 to enable the gate, and allow the signal representative of the desired RPM of the work piece to be coupled therethrough from output terminal $G_2$ of register 20 through input terminal $J_3$ of the inhibit gate to its output terminal $J_2$. The generated signal is multiplied by the selected gear range multiplier stored within register 30, which multiplication is performed within arithmetic multiplier 32, and the resulting signal is again multiplied by a factor of 100 by multiplier 34 to produce the desired signal representative of a binary coded decimal number which is in the form of the desired percent spindle motor speed. This signal is processed by the digital to analog converter and the spindle servo drive shown in U.S. Pat. 3,665,170 to adjust the spindle speed to an RPM value which will insure relative constant surface speed of the rotating work piece being cut by the moving cutting tool. As the radius of the work piece is reduced by 0.0001 of a inch, a new input signal is received by R register 18 which is reduced from its previous value. This, in turn, causes a reduction of the product of the radius of the work piece and the previously desired RPM of the spindle or work piece, whereby the signal representative of this product is less than the signal representative of the product of the conversion constant and the desired constant surface speed. This, in turn, causes inhibit gate 28 to be disabled, and an output signal at output $I_3$ of comparator control unit 26 to be produced and coupled to the input terminal $G_1$ of register 20 to increase the binary coded decimal number representative of the desired RPM until the signals received at input terminals $I_1$ and $I_2$ of comparator control unit 26 are again made approximately equal. Once this occurs, the inhibit gate is again enabled and a new signal in the form of a BCD number representative of the desired RPM is generated at output $J_2$ of the inhibit gate. The generated signal is again multiplied by the gear range multiplier and multiplier 34 to produce the desired signal in binary coded decimal form, which is then converted to a form that is used to change and update the RPM of the spindle which holds the work piece so as to continue to maintain constant surface speed of the work piece being cut. The apparatus continues to function in the above described manner until the work piece is reduced to the desired final form, while at the same time maintaining relatively constant the surface speed of the material being cut. Inasmuch as the apparatus described above simply and directly produces the necessary signal for changing the spindle motor speed to maintain the desired constant surface speed of the work piece, without resort to integrating circuitry or unstable closed loop operation, this apparatus is able to satisfy the objects of the invention without any of the inherent problems of the previously described prior art techniques.

Although the invention has been described with reference to a specific embodiment thereof, numerous modifications are possible without departing from the invention, and it is desirable to cover all modifications falling within the spirit and scope of this invention.

What we claim as new and desire to secure by Letters Patent of the United States is:

1. Apparatus for maintaining a constant surface speed of a rotating work piece being cut by a moving cutting tool, comprising:

a. means for storing a first signal representing a binary coded decimal number further representative of the product of the desired constant surface speed of the work piece and a conversion constant;

b. a register for receiving a second signal representing a binary coded decimal number further representative of the current radial dimension of the work piece being cut;

c. means for storing a third signal representing a binary coded decimal number initially representative of an assumed rotational speed of the work piece;

d. means for arithmetically multiplying the binary coded decimal number representative of the radial dimension of the work piece by the binary coded decimal number representative of the assumed rotational speed of the work piece;

e. means for storing a fourth signal representing a binary coded decimal number further representative of the product of the radial dimension of the work piece and the assumed rotational speed of the work piece.

f. means for comparing the first signal representing the binary coded decimal number representative of the product of the desired constant speed of the work piece and the conversion constant with the fourth signal representing the binary coded decimal number representative of the product of the radial dimension of the work piece and the assumed rotational speed of the work piece and for providing a fifth signal to adjust the binary coded decimal number representative of the assumed rotational speed of the work piece; and g. means for generating a sixth signal representing a final binary coded decimal number representative of the required rotational speed of the work piece, when the compared first and fourth signals are made approximately equal, to control the speed of a motor that drives a spindle which holds the work piece.

2. Apparatus for maintaining a constant surface speed of a rotating work piece being cut by a moving cutting tool according to claim 1, wherein said means for storing the first signal representing the binary coded decimal number representative of the product of the desired constant surface speed of the work piece and the conversion constant is comprised of:

a. a first shift register containing a seventh signal representing a binary coded decimal number representative of the desired constant surface speed of the work piece;

b. a second shift register containing therein an eighth signal representing a binary coded decimal number representative of the conversion constant;

c. means for arithmetically multiplying the number representative of the conversion constant by the number representative of the constant surface speed of the work piece; and d. a storage register for holding the first signal representing the binary coded decimal number representative of the product of the conversion constant and the desired constant surface speed of the work piece.

3. Apparatus for maintaining a constant surface speed of a rotating work piece being cut by a moving cutting tool according to claim 1, further comprising:

a. means for storing a ninth signal representing a binary coded decimal number which is the reciprocal of a maximum allowable rotational speed of the work piece for a selected gear range;

b. means for multiplying the binary coded decimal number representative of the required rotational speed of the work piece by the binary coded decimal number representative of the reciprocal of the maximum allowable rotational speed of the work piece for the selected gear range;

c. means for multiplying by a factor of 100 the multiple of the binary coded decimal number representative of the required rotational speed of the work piece and the reciprocal of the maximum allowable rotational speed of the work piece for the selected gear range to obtain a tenth signal representing a binary coded decimal number representative of a percentage spindle motor speed for controlling the surface speed of the rotating work piece.

* * * * *